United States Patent
Colebrooke

(10) Patent No.: US 12,320,285 B2
(45) Date of Patent: Jun. 3, 2025

(54) EXHAUST NOZZLE

(71) Applicant: ROLLS-ROYCE plc, London (GB)

(72) Inventor: Jack F. Colebrooke, Bristol (GB)

(73) Assignee: ROLLS-ROYCE plc, London (GB)

( * ) Notice: Subject to any disclaimer, the term of this patent is extended or adjusted under 35 U.S.C. 154(b) by 0 days.

(21) Appl. No.: 18/775,672

(22) Filed: Jul. 17, 2024

(65) Prior Publication Data

US 2025/0035027 A1 Jan. 30, 2025

(30) Foreign Application Priority Data

Jul. 24, 2023 (GB) .................................. 2311299

(51) Int. Cl.
F01N 13/10 (2010.01)
F01N 13/18 (2010.01)

(52) U.S. Cl.
CPC ............. F01N 13/10 (2013.01); F01N 13/18 (2013.01); F05D 2250/90 (2013.01)

(58) Field of Classification Search
CPC ....... F01N 13/10; F01N 13/18; F05D 2250/90
See application file for complete search history.

(56) References Cited

U.S. PATENT DOCUMENTS

| | | |
|---|---|---|
| 2,969,641 A | 1/1961 | Schaefer |
| 2,999,354 A | 9/1961 | Gallo et al. |
| 4,000,854 A | 1/1977 | Konarski et al. |
| 4,196,856 A * | 4/1980 | James ................... F02K 1/1223 60/228 |
| 4,310,121 A * | 1/1982 | Basinski, Jr. ......... F02K 1/1223 239/265.33 |
| 4,361,281 A | 11/1982 | Nash |
| 4,447,009 A * | 5/1984 | Wiley ................... F02K 1/1292 239/265.39 |
| 4,587,806 A * | 5/1986 | Madden .................... F02K 1/12 244/12.5 |
| 4,690,329 A * | 9/1987 | Madden .................... F02K 1/62 239/265.19 |
| 4,753,392 A * | 6/1988 | Thayer ...................... F02K 1/60 239/265.29 |
| 4,778,109 A | 10/1988 | Jourdain et al. |

(Continued)

OTHER PUBLICATIONS

Great Britain search report dated Nov. 13, 2023, issued in GB Patent Application No. 2311299.8.

(Continued)

*Primary Examiner* — Jesse S Bogue

(57) ABSTRACT

An exhaust nozzle for a gas turbine engine comprises an exhaust duct and a first flap. The exhaust duct is configured to receive an exhaust flow of gas from a combustor of the gas turbine engine. The first flap is rotatably coupled to the exhaust duct for rotation about a first axis of rotation. Further, the first flap at least in part defines an exhaust gas passageway configured to convey the exhaust flow of gas to an exterior of the gas turbine engine. Additionally, the first flap comprises a first pin. The exhaust nozzle comprises a first moveable cam having a first moveable slot configured to slidably receive the first pin. The exhaust nozzle is configured such that movement of the first moveable cam causes the first flap to be moved about the first axis of rotation between a first inner position and a first outer position.

18 Claims, 9 Drawing Sheets

(56) References Cited

U.S. PATENT DOCUMENTS

| | | | |
|---|---|---|---|
| 5,092,525 A * | 3/1992 | Roach | F02K 1/625 |
| | | | 239/265.29 |
| 5,103,639 A | 4/1992 | Wolf | |
| 5,199,643 A * | 4/1993 | Rozmus | F02K 1/1207 |
| | | | 446/56 |
| 5,201,800 A * | 4/1993 | Wolf | F02K 1/15 |
| | | | 239/265.19 |
| 2024/0175408 A1* | 5/2024 | Colebrooke | F02K 1/002 |
| 2024/0191672 A1* | 6/2024 | Colebrooke | F02K 1/1223 |

OTHER PUBLICATIONS

European search report dated Dec. 11, 2024, issued in EP Patent Application No. 24184577.5.

* cited by examiner

EXHAUST NOZZLE

CROSS-REFERENCE TO RELATED APPLICATIONS

This specification is based upon and claims the benefit of priority from UK Patent Application No. GB 2311299.8, filed on 24 Jul. 2023, the entire contents of which are incorporated herein by reference.

BACKGROUND

Technical Field

The present disclosure relates to an exhaust nozzle for a gas turbine engine.

Description of the Related Art

It is known for gas turbine engines to have variable geometry exhaust nozzles. Such variable geometry exhaust nozzles comprise exhaust flaps that may be individually controlled to vary the exit area of the exhaust nozzle. Variable geometry exhaust nozzles may be used to maximise the production of thrust at high nozzle pressure ratios and to provide thrust vectoring. Thrust vectoring may also be provided by independently controlling the exhaust flaps. In such arrangements, when opposing exhaust flaps are moved synchronously, there is a change in the exit area of the gas turbine engine which may be undesirable. When opposing exhaust flaps are moved asynchronously, both the exit area of the gas turbine engine and the thrust vector are changed, resulting in thrust loss or an unintended vector.

It is therefore desirable to provide an improved exhaust nozzle and method of operating an exhaust nozzle that overcomes some or all of these issues.

SUMMARY

According to a first aspect of the present disclosure, there is provided an exhaust nozzle for a gas turbine engine, the exhaust nozzle comprising:
 an exhaust duct configured to receive an exhaust flow of gas from a combustor of the gas turbine engine; and
 a first flap rotatably coupled to the exhaust duct for rotation about a first axis of rotation;
 wherein the first flap at least in part defines an exhaust gas passageway configured to convey the exhaust flow of gas to an exterior of the gas turbine engine,
 wherein the first flap comprises a first pin,
 wherein the exhaust nozzle comprises a first moveable cam having a first moveable slot configured to slidably receive the first pin, and
 wherein the exhaust nozzle is configured such that movement of the first moveable cam causes the first flap to be moved about the first axis of rotation between a first inner position and a first outer position.

It may be that a centreline of the first moveable slot extends along a first moveable arc having a centre that is offset from the first axis of rotation.

The exhaust duct may comprise a first static slot configured to slidably receive the first pin.

It may be that a centreline of the first static slot extends along a first static arc having a centre that is coincident with the first axis of rotation.

It may be that the first static slot is formed in a side wall of the exhaust nozzle. The side wall of the exhaust nozzle may partially define the exhaust gas passageway.

The exhaust nozzle may comprise a first actuator configured to move the first moveable cam and thereby cause the first flap to be actuated between the first inner position and the first outer position.

The exhaust nozzle may comprise a side wall partially defining the exhaust gas passageway, wherein the side wall is disposed between at least a part of the first actuator and the exhaust gas passageway.

The exhaust nozzle may comprise a second flap rotatably coupled to the exhaust duct for rotation about a second axis of rotation. The first and second flaps may at least in part define the exhaust gas passageway. The second flap may comprise a second pin. The exhaust nozzle may comprise a second moveable cam having a second moveable slot configured to slidably receive the second pin. The exhaust nozzle may be configured such that movement of the second moveable cam causes the second flap to be moved about the second axis of rotation between a second inner position and a second outer position. A centreline of the second moveable slot may extend along a second moveable arc having a centre that is offset from the first and second axes of rotation.

It may be that the first actuator is configured to move the second moveable cam and thereby cause the second flap to be actuated between the second inner position and the second outer position.

It may be that the first moveable cam and the second moveable cam form at least part of an integral moveable cam structure such that the first moveable cam and the second moveable cam are configured to move in unison.

The exhaust nozzle may comprise a second actuator configured to move the second moveable cam and thereby cause the second flap to be actuated between the second inner position and the second outer position.

The exhaust duct may comprise a second static slot configured to slidably receive the second pin.

It may be that a centreline of the second static slot extends along a second static arc having a centre that is coincident with the first and second axes of rotation.

It may be that the second static slot is formed in a side wall of the exhaust nozzle. The side wall of the exhaust nozzle may partially define the exhaust gas passageway.

It may be that the exhaust nozzle further comprises a first roller rotatably coupled to the exhaust duct and the first flap comprises a first bearing surface configured to bear against the first roller during rotational movement of the first flap about the first axis of rotation. The first bearing surface may form part of a first curved surface having a central axis that is coaxial with the first axis of rotation.

It may also be that the exhaust nozzle further comprises a second roller rotatably coupled to the exhaust duct and the second flap comprises a second bearing surface configured to bear against the second roller during rotational movement of the second flap about the second axis of rotation. The second bearing surface may form part of a second curved surface having a central axis that is coaxial with the first and second axes of rotation.

Each curved surface may be a cylindrical surface. The radius of the first cylindrical surface may be equal to the radius of the second cylindrical surface.

It may be that the exhaust duct comprises a first side wall and a second side wall. The exhaust nozzle may further comprise a first shaft extending between the first side wall and the second side wall that rotatably supports the first roller. The exhaust nozzle may further comprise a second shaft extending between the first side wall and the second side wall that rotatably supports the second roller.

It may be that the radius of the first moveable arc is equal to the radius of the second moveable arc.

It may be that the first pin and the first roller are circumferentially separated with respect to the first axis of rotation. It may also be that the second pin and the second roller are circumferentially separated with respect to the second axis of rotation.

The first flap may comprise a first control surface that in part defines the exhaust gas passageway. The second flap may comprise a second control surface that in part defines the exhaust gas passageway. The first control surface and the second control surface may be reflections of each other.

It may be that the first flap and the second flap are convergent-divergent flaps, such that the first flap and the second flap define a convergent-divergent nozzle.

It may be that the first flap and the second flap are convergent flaps, such that the first flap and the second flap define a convergent nozzle.

According to a second aspect of the present disclosure, there is provided a system comprising: an exhaust nozzle in accordance with the first aspect and a controller, wherein the controller is configured to, in a variable geometry mode of operation, control the first actuator to actuate the first and second flaps at a same rate of angular rotation and in different rotational directions about the first and second axes of rotation.

According to a third aspect of the present disclosure, there is provided a system comprising: an exhaust nozzle in accordance with the first aspect and a controller, wherein the controller is configured to, in a vectoring mode of operation, control the first and second actuators to actuate the first and second flaps at a same rate of angular rotation and in the same rotational direction about the first and second axes of rotation.

It may be that the controller is configured to, in a variable geometry mode of operation, control the first and second actuators to actuate the first and second flaps at different rates of angular rotation and/or in different rotational directions about the first and second axes of rotation.

According to a fourth aspect of the present disclosure, there is provided an exhaust nozzle for a gas turbine engine, the exhaust nozzle comprising:
an exhaust duct configured to receive an exhaust flow of gas from a combustor of the gas turbine engine;
a first flap rotatably coupled to the exhaust duct for rotation about a first axis of rotation;
a side wall; and
a first actuator configured to cause the first flap to be moved about the first axis of rotation between a first inner position and a first outer position;
wherein the first flap and the side wall at least in part define an exhaust gas passageway configured to convey the exhaust flow of gas to an exterior of the gas turbine engine, and
wherein the side wall is disposed between at least a part of the first actuator and the exhaust gas passageway.

According to a fifth aspect there is provided a gas turbine engine comprising: an exhaust nozzle in accordance with the first aspect or in accordance with the fourth aspect; or a system in accordance with the second aspect or in accordance with the third aspect.

DESCRIPTION OF THE DRAWINGS

Embodiments will now be described by way of example only with reference to the accompanying drawings, which are purely schematic and not to scale, and in which.

DETAILED DESCRIPTION

Figure 1:
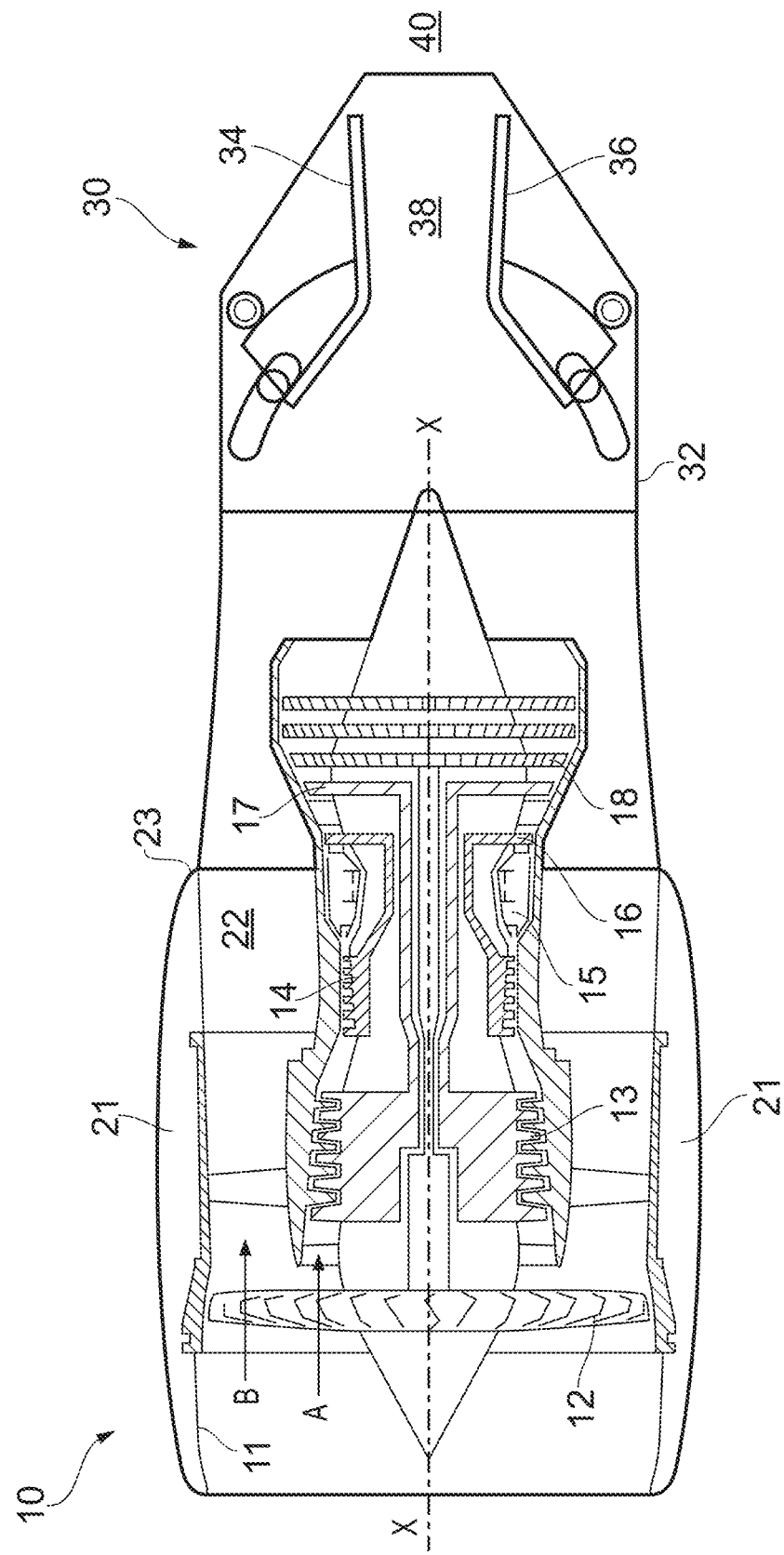
FIG. 1 is a cross-sectional view of an example gas turbine engine and an exhaust nozzle.

FIG. 1 shows a ducted fan gas turbine engine 10 having a principal and rotational axis X-X. The engine comprises, in axial flow series, an air intake 11, a propulsive fan 12, an intermediate-pressure compressor 13, a high-pressure compressor 14, a combustor 15, a high-pressure turbine 16, an intermediate pressure turbine 17, a low-pressure turbine 18 and a core engine exhaust nozzle 19. A nacelle 21 generally surrounds the gas turbine engine 10 and defines the intake 11, a bypass duct 22 and a bypass exhaust nozzle 23.

During operation, air entering the intake 11 is accelerated by the fan 12 to produce two air flows: a first air flow A into the intermediate pressure compressor 13 and a second air flow B which passes through the bypass duct 22 to provide propulsive thrust. The intermediate-pressure compressor 13 compresses the air flow A directed into it before delivering that air to the high-pressure compressor 14 where further compression takes place.

The compressed air exhausted from the high-pressure compressor 14 is directed into the combustor 15 where it is mixed with fuel and the mixture combusted. The resultant hot combustion products then expand through, and thereby drive the high, intermediate and low-pressure turbines 16, 17, 18 before being exhausted through the core engine exhaust nozzle 19 to provide additional propulsive thrust. The high, intermediate and low-pressure turbines respectively drive the high and intermediate pressure compressors 14, 13 and the fan 12 by suitable interconnecting shafts.

The gas turbine engine 10 further comprises an exhaust nozzle 30. The exhaust nozzle 30 is disposed at a rear end of the gas turbine engine 10 and generally comprises an exhaust duct 32, a first flap 34 (also referred to as a petal) and a second flap 36. The exhaust duct 32 is configured to receive an exhaust flow of gas from the combustor 15 (i.e., the first air flow A after it has passed through the combustor 15). The exhaust duct is further configured to receive the second air flow B after it has passed through the bypass duct 22. The first and second flaps 34, 36 in part define an exhaust gas passageway 38 configured to convey the exhaust flow of gas to an exterior 40 of the gas turbine engine 10.

Figure 2:
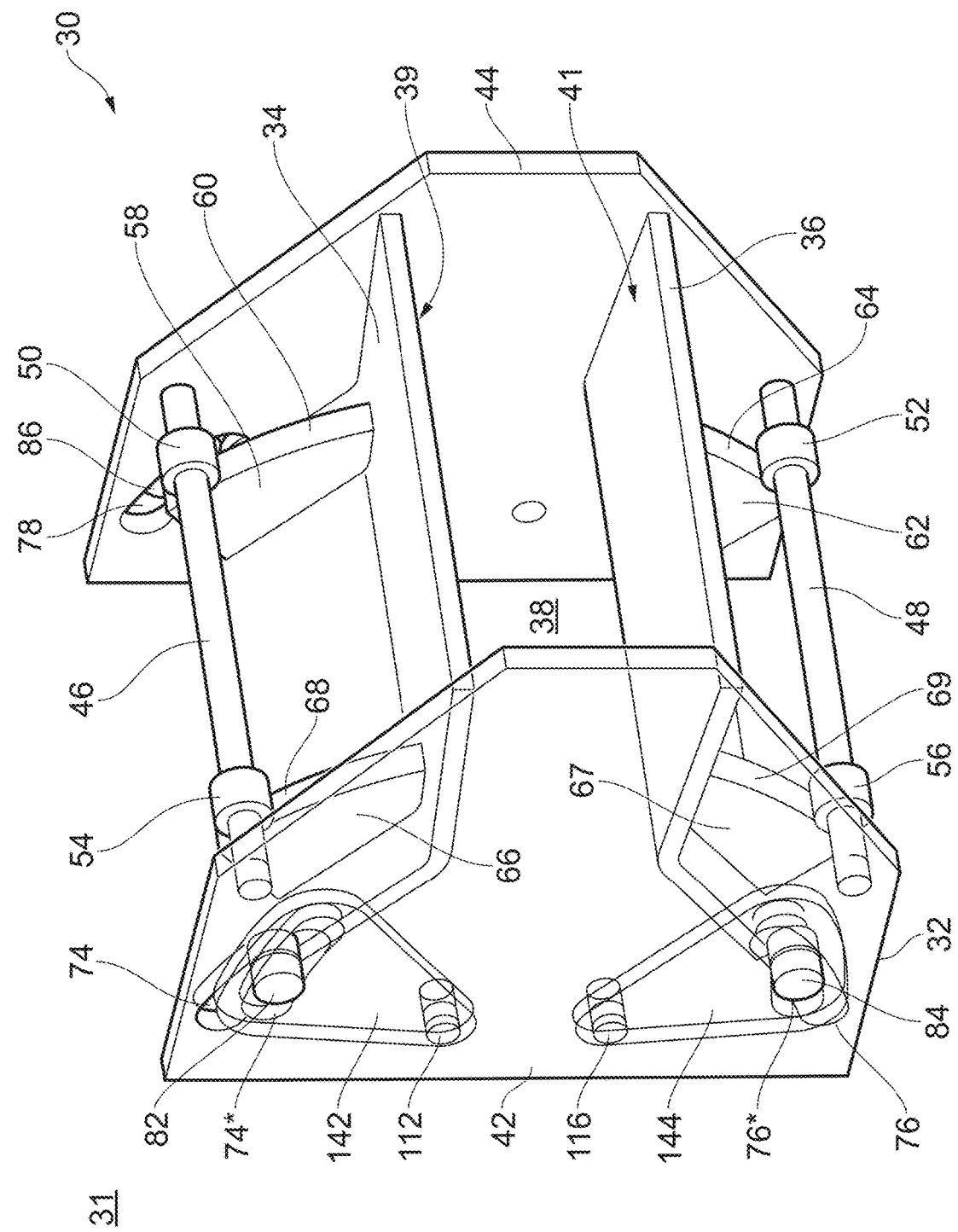
FIG. 2 is a perspective view of a first example exhaust nozzle in isolation.

FIG. 2 is a perspective view of a first example exhaust nozzle 30 suitable for use as the exhaust nozzle 30 in the gas turbine engine 10 of FIG. 1. As shown, the exhaust duct 32 comprises a first side wall 42 and a second side wall 44. The first and second side walls 42, 44 are spaced apart from each other. The first flap 34 is disposed between the first and second side walls 42, 44 in an upper portion of the exhaust nozzle 30. The second flap 36 is disposed between the first and second side walls 42, 44 in a lower portion of the exhaust nozzle 30. The first and second flaps 34, 36 seal against the first and second side walls 42, 44 by means of a conformal controlled gap. The first flap 34 comprises a first control surface 39 and the second flap 36 comprises a second control surface 41. The first control surface 39 and the second control surface 41 in part define (along with the first and second side walls 42, 44) the exhaust gas passageway 38. The first and second control surfaces 39, 41 are geometrically similar and are reflections of each other.

A first shaft or tiebar 46 extends between the first and second side walls 42, 44 in an upper portion of the exhaust nozzle 30. A second shaft or tiebar 48 extends between the first and second side walls 42, 44 in a lower portion of the exhaust nozzle 30. A first roller 54 is rotatably supported by the first shaft 46 and a second roller 56 is rotatably supported by the second shaft 48. In addition, a third roller 50 is rotatably supported by the first shaft 46 and a fourth roller 52 is rotatably supported by the second shaft 48. The first flap 34 comprises a first cam track or flange 66 that protrudes from the respective control surface to define a first bearing surface 68. The second flap 36 comprises a second cam track or flange 67 that similarly protrudes from the respective control surface to define a second bearing surface 69. The second cam track 67 and second bearing surface 69 are located on the second flap 36 in corresponding positions to the first cam track 66 and first bearing surface 68. The first flap 34 further comprises a third cam track 58 that defines a third bearing surface 60. The second flap 36 further comprises a fourth cam track 62 that defines a fourth bearing surface 64. The fourth cam track 62 and bearing surface 64 are located on the second flap 36 in corresponding positions to the third cam track 58 and third bearing surface 60.

The first side wall 42 comprises a first static slot 74 in an upper portion of the exhaust nozzle 30. The first side wall 42 further comprises a second static slot in a lower portion of the exhaust nozzle 30. The second side wall 44 comprises a third static slot 78 in an upper portion of the exhaust nozzle 30. The second side wall 44 further comprises a fourth static slot in a lower portion of the exhaust nozzle 30 (not shown by FIG. 2). The first flap 34 comprises a first pin 82 that is slidably received by the first static slot 74. The second flap 36 comprises a second pin 84 that is slidably received by the second static slot. The first flap 34 further comprises a third pin 86 that is slidably received by the third static slot 78. The second flap 36 further comprises a fourth pin 88 that is slidably received by the fourth slot 80 (not shown by FIG. 2). Further features of the first example exhaust nozzle 30 shown and not shown in FIG. 2 are now described with reference to FIGS. 3 to 6.

Figure 3:
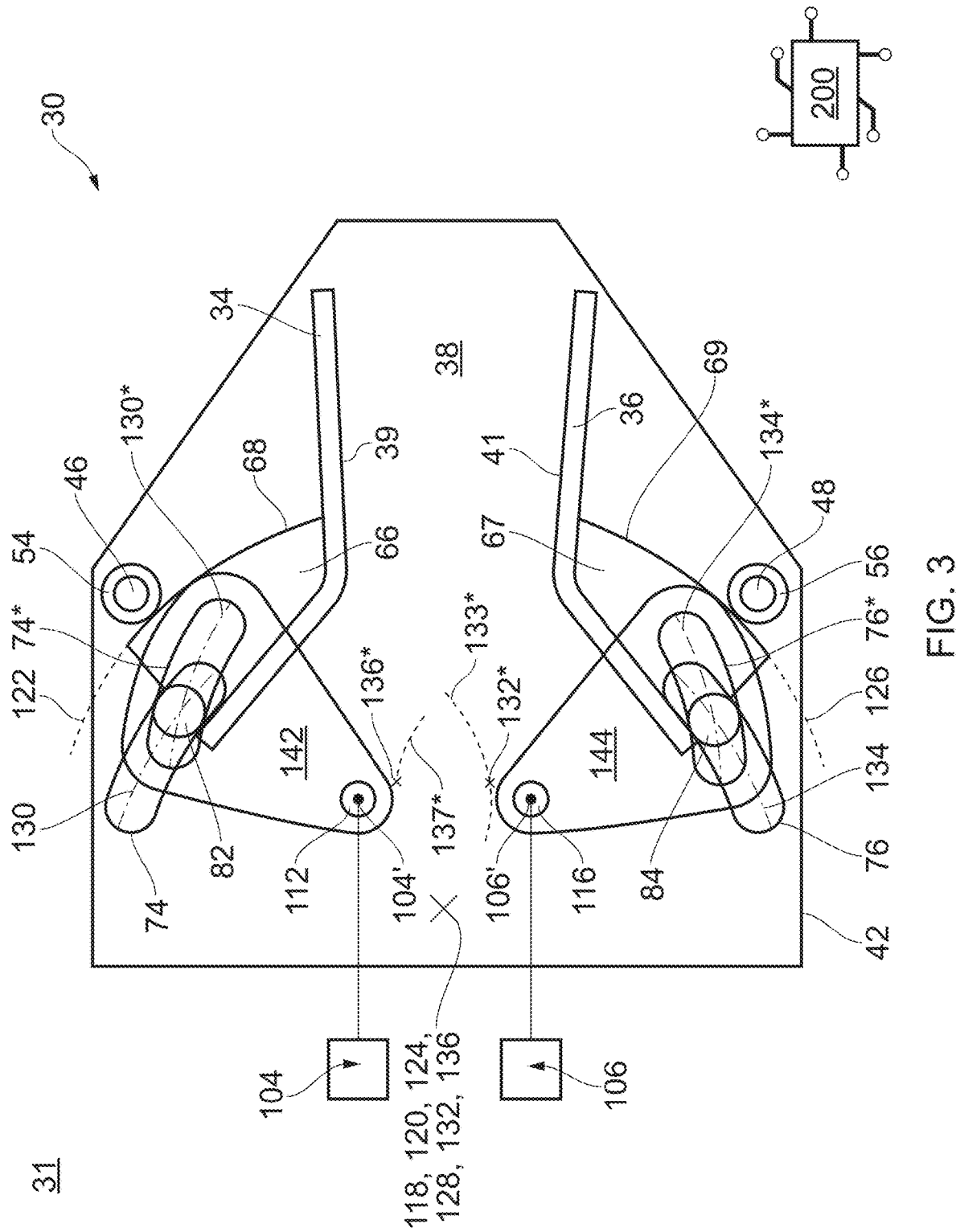
FIG. 3 is a side view of the first example exhaust nozzle in a non-vectored dry-thrust configuration.

FIG. 3 is a side view of the first example exhaust nozzle 30 shown by FIG. 2 in a non-vectored dry-thrust configuration. The non-vectored dry-thrust configuration of the exhaust nozzle 30 is suitable for use when the engine 10 is operating dry (e.g., without reheat) and vectoring of thrust produced by the engine 10 away from a direction parallel to the rotational axis X-X is not intended. As described in further detail below, the first flap 34 is rotatably coupled to the exhaust duct 32 for rotation about a first axis of rotation 118 and the second flap 36 is rotatably coupled to the exhaust duct 32 for rotation about a second axis of rotation 120 that is coaxial (i.e. aligned) with the first axis of rotation 118. The first and second axes of rotation 118, 120 may be defined so as to give the optimal expansion ratio between the throat and exit of the exhaust nozzle 30.

The first flap 34 comprises a convergent portion and a divergent portion. Accordingly, the first flap 34 is a convergent-divergent flap. Likewise, the second flap 36 comprises a convergent portion and a divergent portion. Accordingly, the second flap 36 is also a convergent-divergent flap. The first and second flaps 34, 36 therefore define a convergent-divergent nozzle, but in other examples may have an alternative configuration that does not define a convergent-divergent nozzle.

Figure 5:
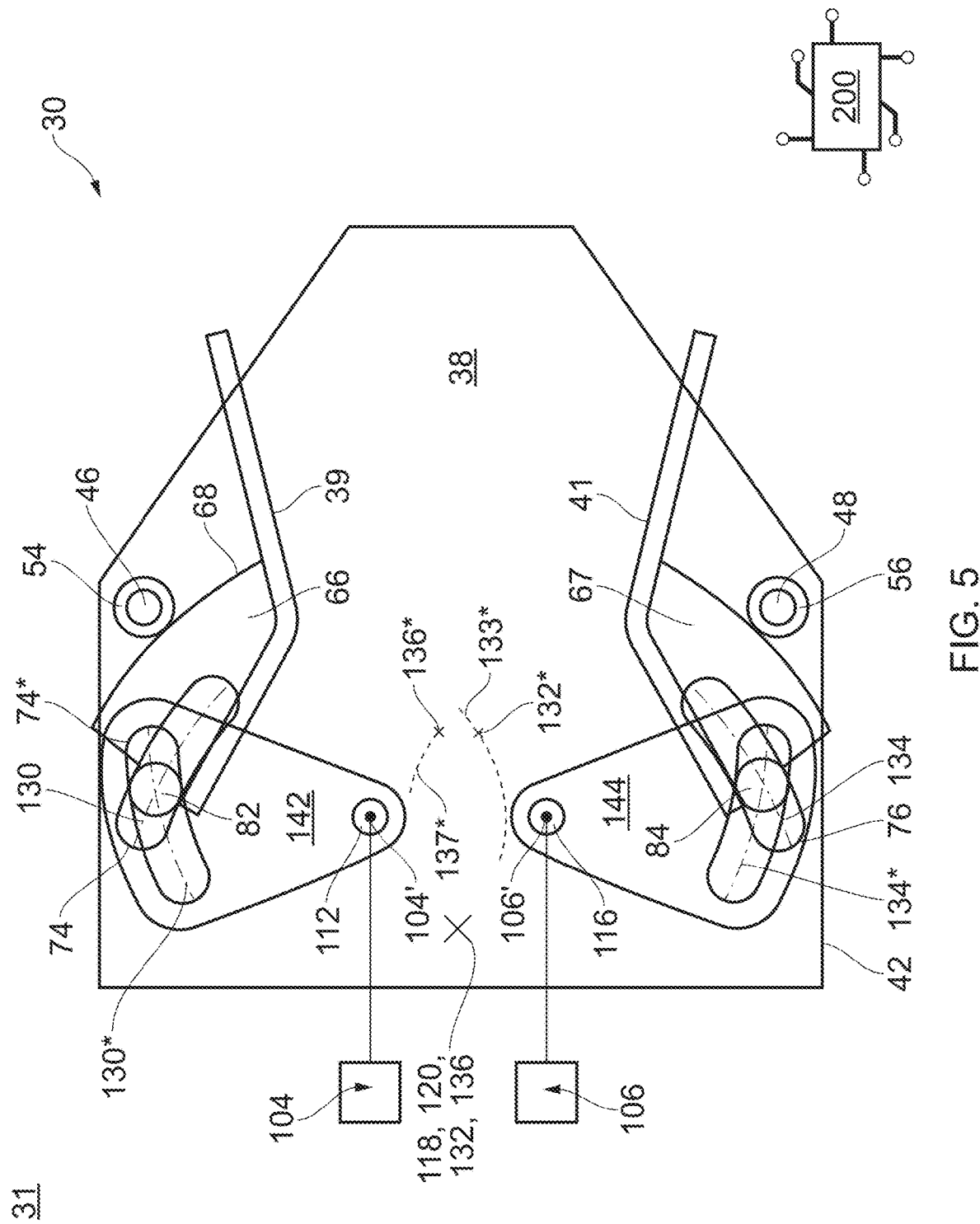
FIG. 5 is a side view of the first example exhaust nozzle in a non-vectored wet-thrust configuration.

As shown in FIG. 3, the first bearing surface 68 forms part of a first curved surface 122 having a central axis 124 that is coaxial with the first and second axes of rotation 118, 120. The second bearing surface 69 forms part of a second curved surface 126 having a central axis 128 that is coaxial with the first and second axes of rotation 118, 120. In the example of FIG. 5, each curved surface 122, 126 is a cylindrical surface 122, 126 and the radius of the first cylindrical surface 122 is equal to the radius of the second cylindrical surface 126. Accordingly, the first and second cylindrical surfaces 122, 126 are coincident. A centreline of the first static slot 74 extends at least part way along a first static arc 130 having a centre 132 that is coincident with the first and second axes of rotation 118, 120. A centreline of the second static slot 76 extends at least part way along a second static arc 134 having a centre 136 that is coincident with the first and second axes of rotation 118, 120. Accordingly, the static slots 74, 76 have corresponding curved shapes. The radius of the first static arc 130 is equal to the radius of the second static arc 134. Accordingly, the first and second static arcs 130, 134 lie on a single circle. The first pin 82 and the first roller 54 are circumferentially separated with respect to the first axis of rotation 118. Similarly, the second pin 84 and the second roller 56 are circumferentially separated with respect to the second axis of rotation 120.

The exhaust nozzle 30 comprises a first moveable cam element 142 and a second moveable cam element 144. The first moveable cam element 142 is rotatably coupled to the first wall 42 at a first pivot 112, whereas the second moveable cam element 144 is rotatably coupled to the first wall 42 at a second pivot 116. In other examples, the first and second pivots 112, 116 may not be located in the first wall 42. For instance, the first and second pivots 112, 116 may be located at other fixed positions within the exhaust nozzle 30. The first moveable cam element 142 comprises a first moveable slot 74* which is configured to slidably receive the first pin 82. The first pin 82 extends through both the first static slot 74 and the first moveable slot 74* so as to partially constrain the relative positions of each. Similarly, the second moveable cam element 144 comprises a second moveable slot 76* which is configured to slidably receive the second pin 84. The second pin 84 extends through both the second static slot 76 and the second moveable slot 76* so as to partially constrain the relative positions of each.

A centreline of the first moveable slot 74* extends at least part way along a first moveable arc 130* having a centre 132*. A centreline of the second moveable slot 76* extends at least part way along a second moveable arc 134* having a centre 136*. Accordingly, each moveable slot 74*, 76* has a curved shape. In this example, the radius of the first moveable arc 130* is equal to the radius of the second moveable arc 134*.

The exhaust nozzle 30 also comprises a first actuator 104 and a second actuator 106. The first actuator 104 is generally configured to move the first moveable cam element 142 and thereby cause the first flap 34 to be moved, whereas the second actuator 106 is generally configured to move the second moveable cam element 142 and thereby cause the second flap 36 to be moved. In the example of FIG. 3, the first actuator 104 is a rotary-type actuator (e.g., including an electric motor) and a driving portion 104' of the first actuator 104 is pivotally coupled to the first moveable cam element 142 at the first pivot 112. Likewise, in the example of FIG. 3, the second actuator 106 is a rotary-type actuator (e.g., an including electric motor) and a driving portion 106' of the second actuator 106 is pivotally coupled to the second moveable cam element 144 at the second pivot 116. However, it will be appreciated that other actuator-types are suitable for use as the first actuator 104 and/or the second actuator 106. For instance, the or each actuator 104, 106 may be a linear-type actuator (e.g., including an electromagnetic solenoid or a hydraulic cylinder) and the driving end of the or each actuator may be coupled to the respectively moveable cam element 142, 144 other than at the pivot 112, 116.

During operation of the exhaust nozzle 30 (e.g., to move the flaps 34, 36), the first actuator 104 is able to actuate the first flap 34 about the first axis of rotation 118 through a plurality of first intermediate positions between a first inner position and a first outer position. It will be appreciated that the first inner position need not be the innermost position that the first flap 34 is able to be actuated to and the first outer position need not be the outermost position that the first flap 34 is able to be actuated to. During actuation of the first flap 34, the first pin 82 slides along the first static slot 74 and the first bearing surface 68 bears against the first roller 54. The first roller 54 constrains the motion of the first flap 34 to a predetermined path, such that movement of the first pin 82 along the first static slot 74 causes the first flap 34 to undertake a predetermined compound movement of translation and rotation with one degree of freedom (i.e., so that each position of the first pin 82 along the first static slot 74 corresponds maps to a single respective translational and rotational position of the first flap 34). In the non-vectored dry-thrust configuration shown by FIG. 3, the first flap 34 has been positioned (by means of the first actuator 104 positioning the first moveable cam element 142) at a first intermediate position between the first inner position and the first outer position.

During operation of the exhaust nozzle 30, the second actuator 106 is able to actuate the second flap 36 about the second axis of rotation 120 through a similar plurality of second intermediate positions in the same way.

The first and second flaps 34, 36 can be actuated to the positions shown in FIG. 3 in the non-vectored dry-thrust configuration. Examples of various additional combinations of positions that the first and second flaps 34, 36 can be actuated to in other configurations are described below with reference to FIGS. 4 to 6.

Figure 4:
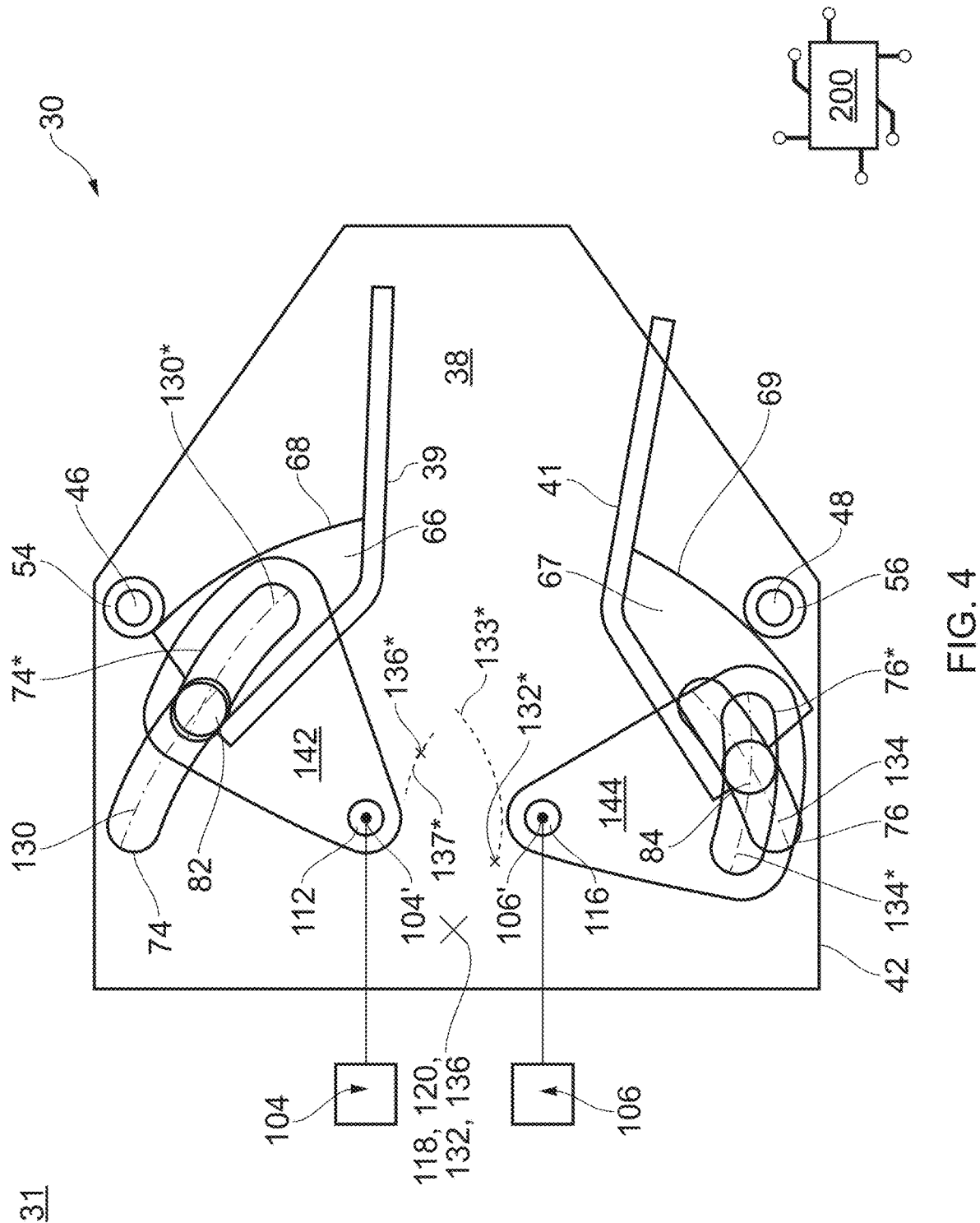
FIG. 4 is a side view of the first example exhaust nozzle in a vectored dry-thrust configuration.

FIG. 4 is a side view of the first example exhaust nozzle 30 shown by FIG. 2 in a vectored dry-thrust configuration. The vectored dry-thrust configuration of the exhaust nozzle 30 is suitable for use when the engine 10 is operating dry and vectoring of thrust produced by the engine 10 away from a direction parallel to the rotational axis X-X is intended. In the vectored dry-thrust configuration, the first flap 34 has been positioned (by means of the first actuator 104 positioning the first moveable cam element 142) at a first inner position in which the first flap 34 has been rotated approximately 6° closer to the principal rotational axis X-X of the gas turbine engine 10 compared to the first intermediate position shown by FIG. 3; and the second flap 36 has been positioned (by means of the second actuator 106 positioning the first moveable cam element 144) at a second intermediate position in which the second flap 36 has been rotated approximately 6° further from the principal rotational axis X-X of the gas turbine engine 10 compared to the second intermediate position shown by FIG. 3.

FIG. 5 is a side view of the first example exhaust nozzle 30 shown by FIG. 2 in a non-vectored wet-thrust configuration. The non-vectored wet-thrust configuration of the exhaust nozzle 30 is suitable for use when the engine 10 is operating wet (e.g., with reheat) and vectoring of thrust produced by the engine 10 away from a direction parallel to the rotational axis X-X is intended. In the non-vectored wet-thrust configuration, the first flap 34 has been positioned (by means of the first actuator 104 positioning the first moveable cam element 142) at a first intermediate position in which the first flap 34 has been positioned relatively far away from the principal rotational axis X-X of the gas turbine engine 10 compared to the first intermediate position of the non-vectored dry-thrust configuration shown by FIG. 3 and the second flap 36 has been positioned (by means of the second actuator 106 positioning the second moveable cam element 144) at a second intermediate position in which the second flap 36 has been positioned relatively far away from the principal rotational axis X-X of the gas turbine engine 10 compared to the second intermediate position of the non-vectored dry-thrust configuration shown by FIG. 3. A minimum cross-sectional area of the exhaust gas passageway 38 is therefore greater in the non-vectored wet-thrust configuration shown by FIG. 5 than in the non-vectored dry-thrust configuration shown by FIG. 3.

Figure 6:
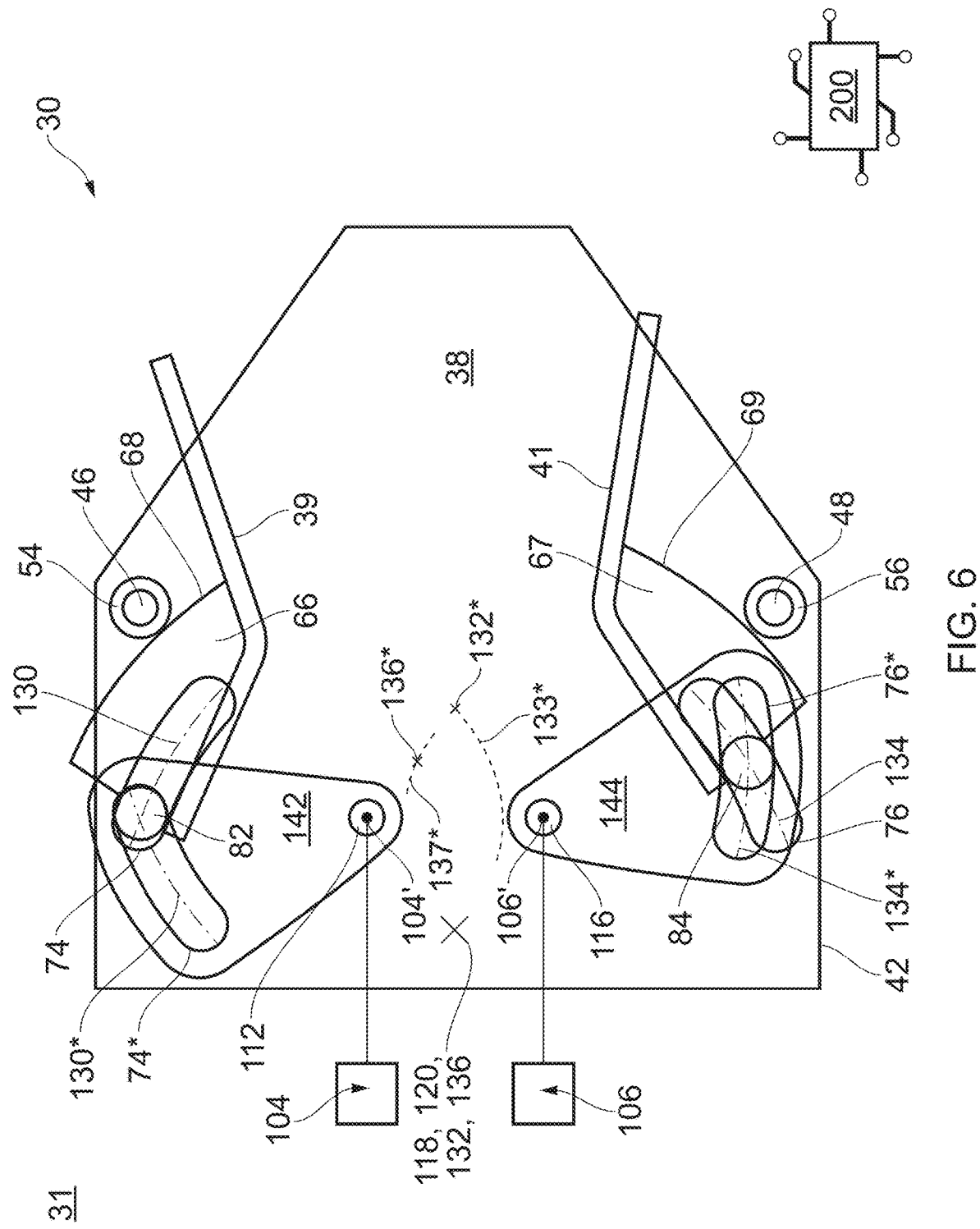
FIG. 6 is a side view of the first example exhaust nozzle in a vectored wet-thrust configuration.

FIG. 6 is a side view of the first example exhaust nozzle 30 shown by FIG. 2 in a vectored wet-thrust configuration. The vectored dry-thrust configuration of the exhaust nozzle 30 is suitable for use when the engine 10 is operating wet and vectoring of thrust produced by the engine 10 away from a direction parallel to the rotational axis X-X is intended. In the vectored wet-thrust configuration, the first flap 34 has been positioned (by means of the first actuator 104 positioning the first moveable cam element 142) at a first outer position in which the first flap 34 has been rotated approximately 6° further from to the principal rotational axis X-X of the gas turbine engine 10 compared to the first intermediate position shown by FIG. 5 and the second flap 36 has been positioned (by means of the second actuator 106 positioning the first moveable cam element 144) at a second intermediate position in which the second flap 36 has been rotated approximately 6° closer to from the principal rotational axis X-X of the gas turbine engine 10 compared to the second intermediate position shown by FIG. 5.

The position of the centre 132* of the first moveable arc 130* varies between each of the positions shown in FIGS. 3 to 6. In particular, the position of the centre 132* moves along a first trace 133* as the first cam element 142 (and therefore the first movable slot 74*) is moved between the positions shown in each of FIGS. 3 to 6. Throughout the range of first intermediate positions and at both the first inner position and the first outer position of the first flap 34, the centre 132* is offset from the first axis of rotation 118. Similarly, the position of the centre 136* of the second moveable arc 134* varies between each of the positions shown in FIGS. 3 to 5. Namely, the position of the centre 136* moves along a second trace 137* as the second cam element 144 (and therefore the second movable slot 76*) is moved between the positions shown in each of FIGS. 3 to 6. Throughout the range of second intermediate positions and at both the second inner position and the second outer position of the second flap 36, the centre 136* is offset from the second axis of rotation 120.

Figure 7:
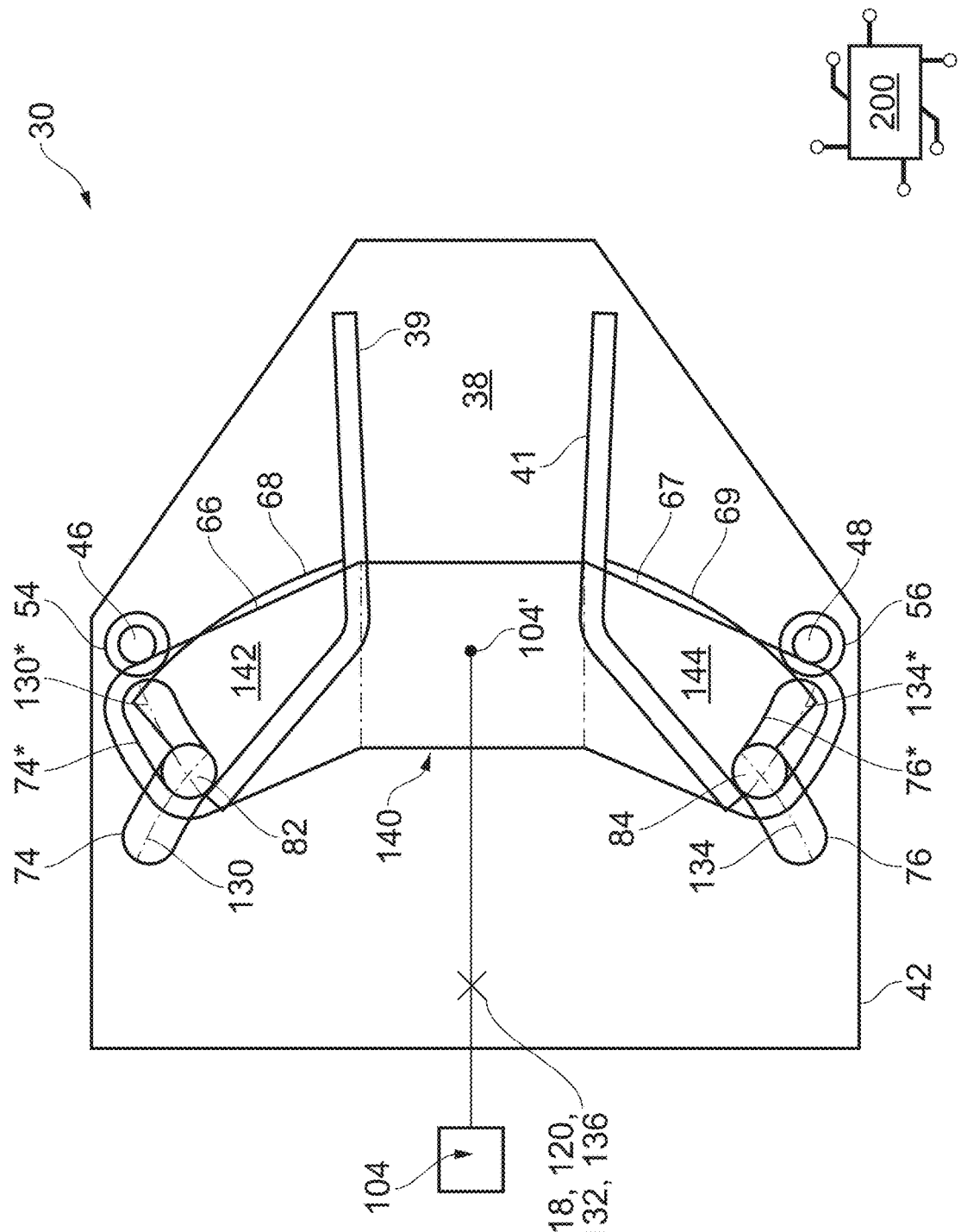
FIG. 7 is a side view of a second example exhaust nozzle in a dry-thrust configuration.

FIG. 7 is a side view of a second example exhaust nozzle 30 in a dry-thrust configuration. The dry-thrust configuration of the exhaust nozzle 30 is suitable for use when the engine 10 is operating dry (e.g., without reheat).

Figure 8:
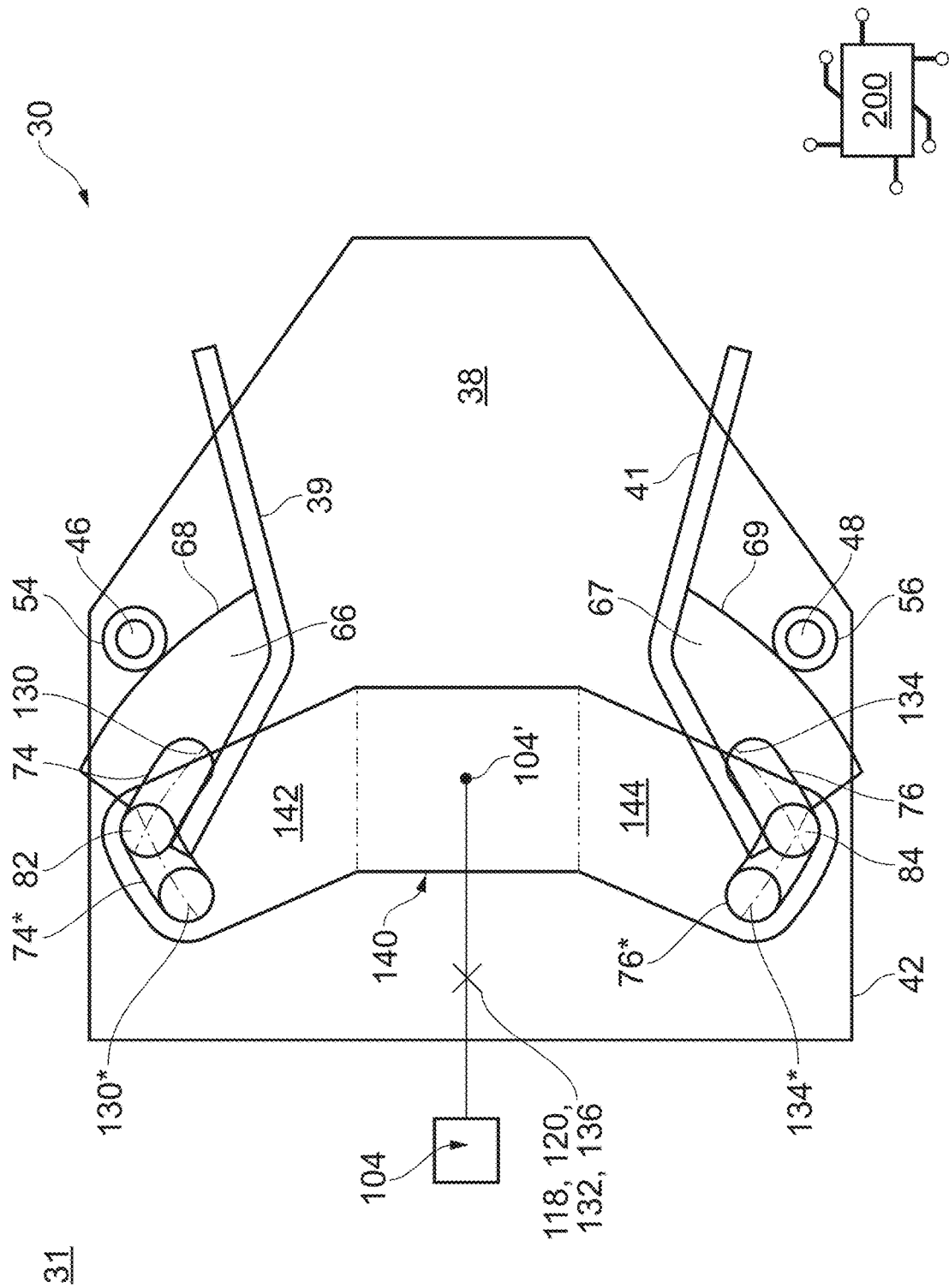
FIG. 8 is a side view of the second example exhaust nozzle in a wet-thrust configuration.

FIG. 8 is a side view of the second example exhaust nozzle 30 in a wet-thrust configuration. The wet-thrust configuration of the exhaust nozzle 30 is suitable for use when the engine 10 is operating wet (e.g., with reheat).

The second example exhaust nozzle 30 is generally similar to the first example exhaust nozzle 30 described above with reference to FIGS. 2 to 6, with like reference numerals denoting common features. However, in contrast to the first example exhaust nozzle 30, the first moveable cam element 142 and the second moveable cam element 144 form part of a moveable integral cam structure 140 in the second example exhaust nozzle 30 shown by FIGS. 7 and 8. By virtue of being integral parts of the moveable integral cam structure 140, the first moveable cam element 142 is configured to move in unison with the second moveable cam element 144 and vice versa. In addition, the second example exhaust nozzle comprises a single actuator 104 which is generally configured to move the integral cam structure 140 and thereby cause both the first flap 34 and the second flap 36 to be moved in accordance with the movement of the first moveable cam element 142 and the second moveable cam element 144. In the example of FIGS. 7 and 8, the single actuator 104 is a linear-type actuator (e.g., including an electromagnetic solenoid or a hydraulic cylinder) and a driving portion 104' of the single actuator 104 is fixed to the moveable integral cam structure 140.

In the dry-thrust configuration of the second example exhaust nozzle 30 shown by FIG. 7, the first flap 34 and the second flap 36 have each been positioned (by means of the single actuator 104 positioning the integral moveable cam structure 140) at respective inner positions in which the flaps 34, 36 have been positioned relatively close to the principal rotational axis X-X of the gas turbine engine. On the other hand, in the wet-thrust configuration of the second example exhaust nozzle 30 shown by FIG. 8, the first flap 34 and the second flap 36 have each been positioned (by means of the single actuator 104 positioning the integral moveable cam structure 140) at respective outer positions in which the flaps 34, 36 have been positioned relatively far from the principal rotational axis X-X of the gas turbine engine. A minimum cross-sectional area of the exhaust gas passageway 38 is therefore greater in the wet-thrust configuration shown by FIG. 8 than in the dry-thrust configuration shown by FIG. 7. A controller 200 may be functionally provided to the exhaust nozzle 30, as shown in each of FIGS. 3 to 8. The controller 200 may be included as part of a system 31 which also includes the exhaust nozzle 30.

In both of the example exhaust nozzles 30 described above, the or each actuator 104, 106 is positioned on a side of the exhaust nozzle 30. That is, the or each actuator 104, 106 is positioned within the exhaust nozzle 30 such that the first side wall 42 is disposed between at least part of (e.g., the driving portion of) the or each actuator 104, 106 and the exhaust gas passageway 38. In particular, the or each actuator 104, 106 may be directly or indirectly mounted to the XX. In a previously-considered exhaust nozzle, an actuator for moving a flap of the exhaust nozzle was positioned on a top or a bottom of the exhaust nozzle (that is, was positioned within the exhaust nozzle such that the flap was disposed between at least part of the actuator and an exhaust gas passageway of the exhaust nozzle). The or each actuator 104, 106 being positioned on the side of the exhaust nozzle 30 is associated with a more compact exhaust nozzle 30 and/or an exhaust nozzle 30 which may be more easily integrated within a gas turbine engine 10 and/or an airframe to which the gas turbine engine 10 is incorporated. In addition, the or each actuator 104, 106 being positioned on the side of the exhaust nozzle 30 rather than on the top and/or the bottom of the exhaust nozzle 30 may enable the use of more lightweight components (e.g., for the or each flap and/or the or each actuator) and therefore enable a mass of the exhaust nozzle 30 to be lowered.

In use, a pressure load imposed by each flap 34, 36 on the corresponding pin 82, 84 is at least partially opposed (e.g., reacted to) by strain in the structure(s) surrounding the respective slots 74, 74*, 76, 76 rather than by being largely (e.g., entirely) opposed by a force provided by the actuator (s) 104, 106. This enables actuator(s) 104, 106 having a relatively lower load rating to be selected for use in the exhaust nozzle 30, which is associated with a reduced size and/or mass of the actuator(s) and therefore a reduced mass of the exhaust nozzle 30 and/or increase ease of incorporation of the exhaust nozzle 30 within a gas turbine engine 10 or an airframe. In addition, the curved shape of the or each moveable slot 74*, 76* has the effect of smoothing a profile of the load applied to (and by) the actuators 104, 106 between the inner and outer positions of the flaps 34, 36, especially as a result of the combination with the curved shape of each static slot 74, 76 and the centres 132*, 136* of each moveable slot 74*, 76* being offset from offset from the first and second axes of rotation 118, 120 (throughout the range of positions of each flap 34, 36). This results in a reduction in the load applied to the actuator(s) 104, 106 at various points between the inner and outer positions of the flaps 34, 36. This may enable the actuator(s) to have a lowered load rating, which is associated with the benefits described above.

Figure 9:
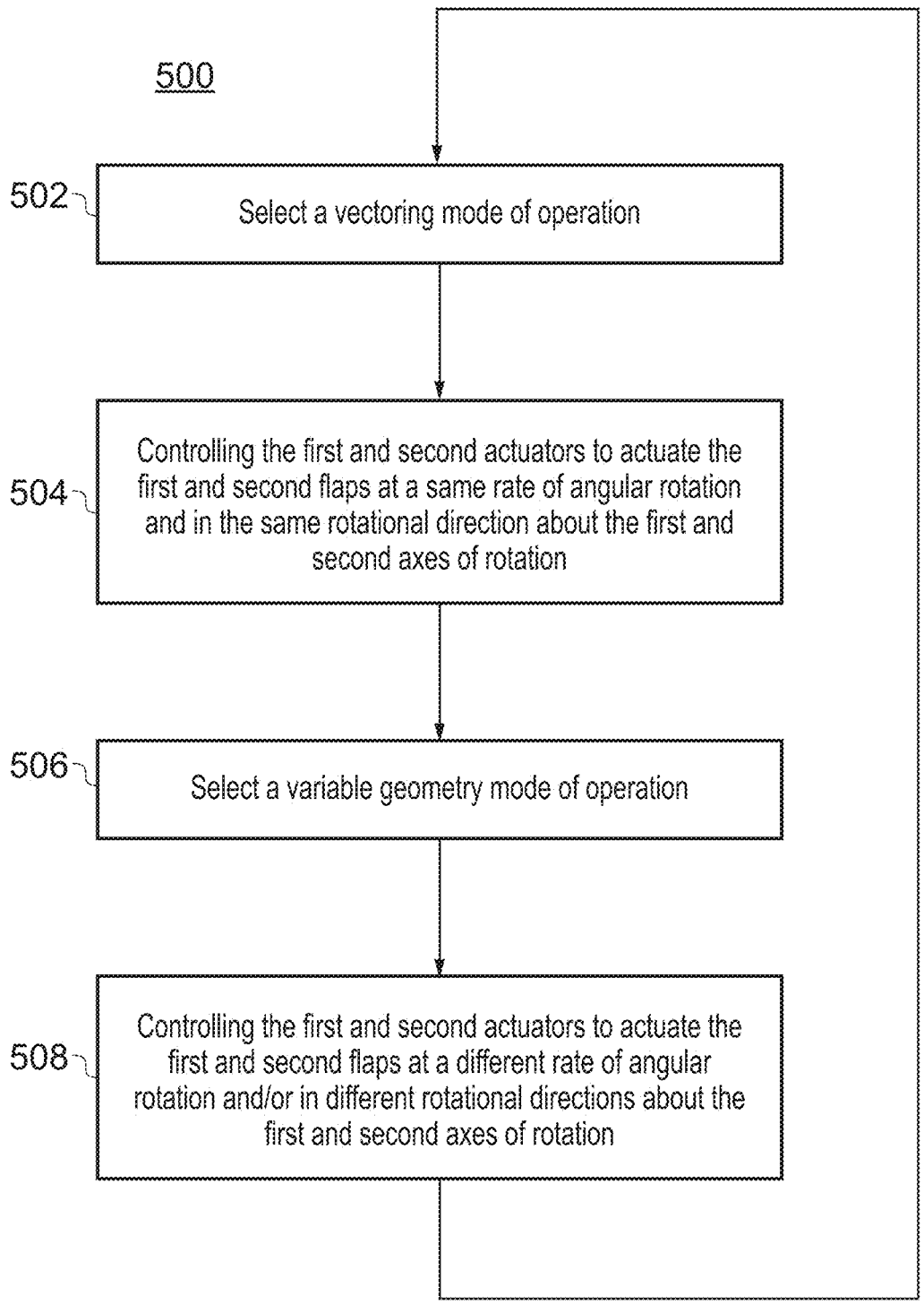
FIG. 9 is a flowchart which shows a method of operating an exhaust nozzle in accordance with the present disclosure.

FIG. 9 is a flowchart of an example method 500 of operating an exhaust nozzle 30 in accordance with the present disclosure. The controller 200 may be configured to operate the exhaust nozzle 30 by carrying out the example method 500. The method 500 comprises a first step 502. In the first step 502, the controller 200 selects a vectoring mode of operation. Upon the vectoring mode of operation having been selected, the method 500 proceeds to a second step 504. In the second step 504, the controller 200 controls the first and second actuators 104, 106 to actuate the first and second flaps 34, 36 at the same rate of angular rotation in the same rotational direction about the first and second axes of rotation 118, 120. This results in thrust vectoring. Since the first and second flaps 34, 36 rotate about a common axis 118, 120, the geometry of the exhaust gas passageway 38 stays the same as the first and second flaps 34, 36 rotate (i.e. the exhaust nozzle 30 does not have variable geometry).

Following the second step 504, a third step 506 is carried out. In the third step 506, the controller 200 selects a variable geometry mode of operation. Upon the variable geometry mode having been selected, the method 500 proceeds to the fourth step 508. In the fourth step 508, the controller 200 controls the first and second actuators 104, 106 to actuate the first and second flaps 34, 36 at a different rate of angular rotation and/or in different rotational directions about the first and second axes of rotation 118, 120. This modifies the geometry of the exhaust gas passageway 38 and thus changes the expansion ratio. The method 500 then proceeds back to the first step 502.

In the fourth step 508, the controller 200 can control the first and second actuators 104, 106 to actuate the first and second flaps 34, 36 at the same rate in opposite directions. This varies the geometry of the exhaust nozzle 30 without changing the direction of the centreline of the exhaust gas passageway 38 (and, thus, without carrying out thrust vectoring).

Alternatively, in the fourth step 508, the controller 200 can control the first and second actuators 104, 106 to actuate the first and second flaps 34, 36 at different rates in different directions. This varies the geometry of the exhaust nozzle 30 while also changing the direction of the centreline of the exhaust gas passageway 38 (and, thus, also carrying out thrust vectoring). It will be appreciated that in the fourth step 508, one of the rates of rotation may be zero.

Alternatively, in the fourth step 508, the controller 200 can control the first and second actuators 104, 106 to actuate the first and second flaps 34, 36 at different rates in the same direction. This varies the geometry of the exhaust nozzle 30 while also changing the direction of the centreline of the exhaust gas passageway 38 (and, thus, also carrying out thrust vectoring). It will be appreciated that in the fourth step 508, one of the rates of rotation may be zero.

Although it has been described that the method 500 starts at the first step 502, it may instead start at the second, third or fourth steps 504, 506, 508. It will also be appreciated that the exhaust nozzle 30 may be configured to be operated in only a single mode of operation (e.g., the vectoring mode of operation or the variable geometry mode of operation). In particular, if the controller 200 is configured to operate the second example exhaust nozzle 30 described above with respect to FIGS. 7 to 8, the controller 200 may only be configured to operate the exhaust nozzle 30 in only the variable geometry mode of operation. If so, the controller 200 controls the single actuator 104 to actuate the first and second flaps 34, 36 at the same rates of angular rotation but in different directions around the respective axes of rotation 118, 120 by virtue of the integral cam structure 140.

In the foregoing description, the first flap is rotatably coupled to the exhaust duct 32 directly. However, it will be appreciated that the rotatable couplings between the first and second flaps and the exhaust duct 32 may instead be indirect rotatable couplings. That is, the first flap may be rotatably coupled to the exhaust duct 32 via intermediate components and the second flap may be rotatably coupled to the exhaust duct 32 via intermediate components.

The invention claimed is:

1. An exhaust nozzle for a gas turbine engine, the exhaust nozzle comprising:
an exhaust duct configured to receive an exhaust flow of gas from a combustor of the gas turbine engine; and
a first flap rotatably coupled to the exhaust duct for rotation about a first axis of rotation;
wherein the first flap at least in part defines an exhaust gas passageway configured to convey the exhaust flow of gas to an exterior of the gas turbine engine,
wherein the first flap comprises a first pin,
wherein the exhaust nozzle comprises a first moveable cam having a first moveable slot configured to slidably receive the first pin,
wherein the exhaust nozzle is configured such that movement of the first moveable cam causes the first flap to be moved about the first axis of rotation between a first inner position and a first outer position, and
wherein the exhaust duct comprises a first static slot configured to slidably receive the first pin.

2. The exhaust nozzle of claim 1, wherein a centreline of the first moveable slot extends along a first moveable arc having a centre that is offset from the first axis of rotation.

3. The exhaust nozzle of claim 1, wherein the first static slot is formed in a side wall of the exhaust nozzle, and wherein the side wall of the exhaust nozzle partially defines the exhaust gas passageway.

4. The exhaust nozzle of claim 1, comprising a first actuator configured to move the first moveable cam and thereby cause the first flap to be actuated between the first inner position and the first outer position.

5. The exhaust nozzle of claim 4, comprising a side wall partially defining the exhaust gas passageway, wherein the side wall is disposed between at least a part of the first actuator and the exhaust gas passageway.

6. An exhaust nozzle for a gas turbine engine, the exhaust nozzle comprising:
an exhaust duct configured to receive an exhaust flow of gas from a combustor of the gas turbine engine;
a first flap rotatably coupled to the exhaust duct for rotation about a first axis of rotation; and
a second flap rotatably coupled to the exhaust duct for rotation about a second axis of rotation,
wherein the first flap at least in part defines an exhaust gas passageway configured to convey the exhaust flow of gas to an exterior of the gas turbine engine,
wherein the first flap comprises a first pin,
wherein the exhaust nozzle comprises a first moveable cam having a first moveable slot configured to slidably receive the first pin,
wherein the exhaust nozzle is configured such that movement of the first moveable cam causes the first flap to be moved about the first axis of rotation between a first inner position and a first outer position,
wherein a centreline of the first moveable slot extends along a first moveable arc having a centre that is offset from the first axis of rotation,
wherein the exhaust duct comprises a first static slot configured to slidably receive the first pin,
wherein the first and second flaps at least in part define the exhaust gas passageway,
wherein the second flap comprises a second pin,
wherein the exhaust nozzle comprises a second moveable cam having a second moveable slot configured to slidably receive the second pin,
wherein the exhaust nozzle is configured such that movement of the second moveable cam causes the second flap to be moved about the second axis of rotation between a second inner position and a second outer position, and
wherein a centreline of the second moveable slot extends along a second moveable arc having a centre that is offset from the first and second axes of rotation.

7. The exhaust nozzle of both claim 6, further comprising a first actuator configured to move the first moveable cam and thereby cause the first flap to be actuated between the first inner position and the first outer position, and
wherein the first actuator is configured to move the second moveable cam and thereby cause the second flap to be actuated between the second inner position and the second outer position.

8. The exhaust nozzle of claim 6, wherein the first moveable cam and the second moveable cam form at least part of an integral moveable cam structure such that the first moveable cam and the second moveable cam are configured to move in unison.

9. The exhaust nozzle of claim 6, comprising a second actuator configured to move the second moveable cam and thereby cause the second flap to be actuated between the second inner position and the second outer position.

10. The exhaust nozzle of claim 6, wherein the exhaust duct comprises a second static slot configured to slidably receive the second pin.

11. The exhaust nozzle of claim 10, wherein the second static slot is formed in a side wall of the exhaust nozzle, and wherein the side wall of the exhaust nozzle partially defines the exhaust gas passageway.

12. The exhaust nozzle of claim 6, wherein the exhaust nozzle further comprises a first roller rotatably coupled to the exhaust duct and the first flap comprises a first bearing surface configured to bear against the first roller during rotational movement of the first flap about the first axis of rotation, wherein the first bearing surface forms part of a first curved surface having a central axis that is coaxial with the first axis of rotation.

13. The exhaust nozzle of claim 6, wherein a radius of the first moveable arc is equal to a radius of the second moveable arc.

14. The exhaust nozzle of claim 6, wherein the first flap comprises a first control surface that in part defines the exhaust gas passageway, wherein the second flap comprises a second control surface that in part defines the exhaust gas passageway, wherein the first control surface and the second control surface are reflections of each other.

15. The exhaust nozzle of claim 6, wherein the first flap and the second flap are convergent-divergent flaps, such that the first flap and the second flap define a convergent-divergent nozzle.

16. A system comprising: the exhaust nozzle of claim 7 and a controller, wherein the controller is configured to, in a variable geometry mode of operation, control the first actuator to actuate the first and second flaps at a same rate of angular rotation and in different rotational directions about the first and second axes of rotation.

17. A system comprising: the exhaust nozzle of claim 9 and a controller, wherein the controller is configured to, in a vectoring mode of operation, control the first and second actuators to actuate the first and second flaps at a same rate of angular rotation and in the same rotational direction about the first and second axes of rotation.

18. The system of claim 17, wherein the controller is configured to, in a variable geometry mode of operation, control the first and second actuators to actuate the first and second flaps at different rates of angular rotation and/or in different rotational directions about the first and second axes of rotation.

* * * * *